United States Patent [19]

Meyer

[11] 3,749,200

[45] July 31, 1973

[54] PORTABLE STAND ADAPTED FOR TREE MOUNTING

[76] Inventor: Leonard S. Meyer, 6449 Bridgewood Rd., Columbia, S.C. 29026

[22] Filed: Feb. 24, 1972

[21] Appl. No.: 229,116

[52] U.S. Cl. .............................................. 182/187
[51] Int. Cl. ............................................. A47g 9/10
[58] Field of Search ................... 182/187, 121, 122, 182/129; 248/240.3, 218, 230, 221

[56] References Cited
UNITED STATES PATENTS

| | | | |
|---|---|---|---|
| 2,833,333 | 5/1958 | Babineau | 182/187 |
| 1,004,284 | 9/1911 | Lehmann | 182/121 |
| 2,425,025 | 8/1947 | Boisselier | 182/129 |
| 1,759,966 | 5/1930 | Swinney | 182/187 |
| 857,203 | 6/1907 | Randall | 182/187 |
| 3,396,818 | 8/1968 | Moragne | 182/187 |

*Primary Examiner*—Reinaldo P. Machado
*Attorney*—Synnestvedt & Lechner

[57] ABSTRACT

A portable stand is disclosed particularly adapted for use by hunters and naturalists, the stand being removably mountable upon trees and having spaced beams which are adjustable to embrace trees of different sizes. The stand is further provided with spaced supporting legs which are adjustable in both length and angular disposition in order to adapt the stand to the trunk or branches of trees of various shapes. The stand is arranged for convenient erection and collapse, so that it may readily be transported from place to place.

3 Claims, 6 Drawing Figures

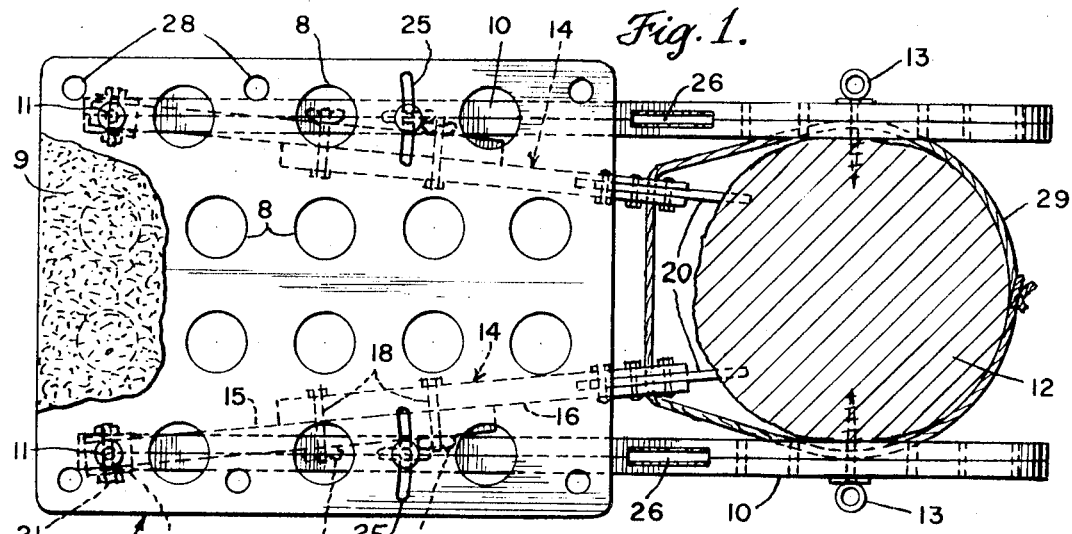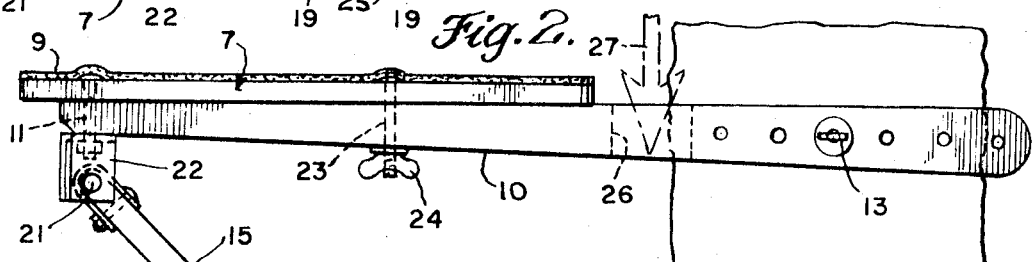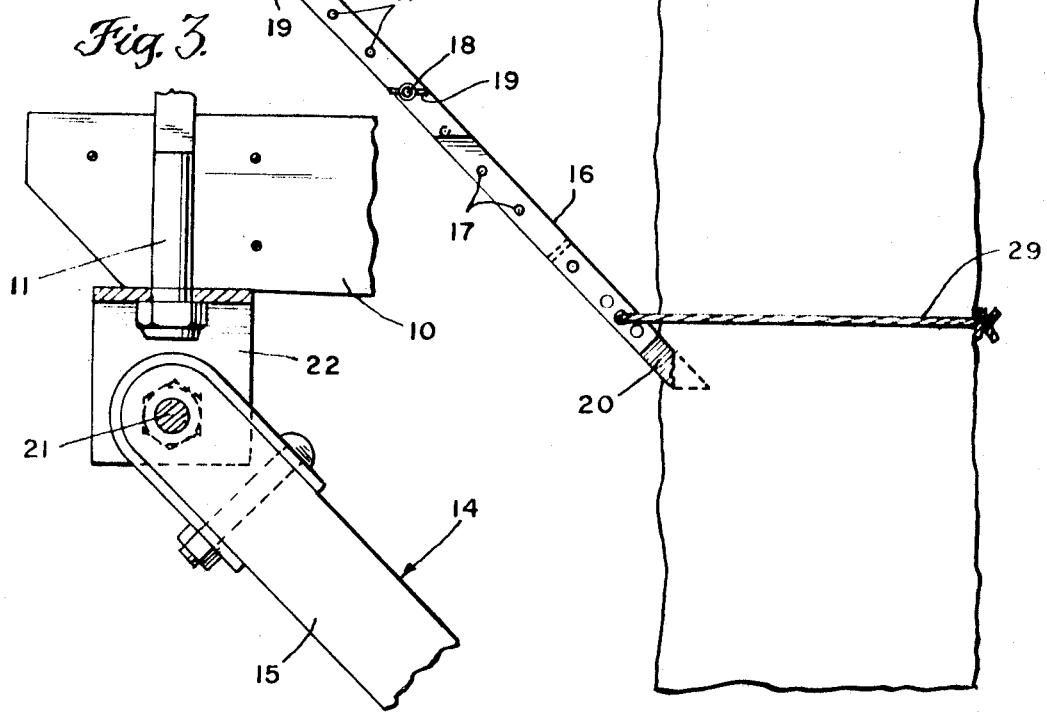

PORTABLE STAND ADAPTED FOR TREE MOUNTING

This invention relates to a portable stand especially adapted for tree mounting, the stand being provided with a platform on which hunters or naturalists may stand or sit at a desired elevation above the ground.

One of the major objectives of the invention is to provide a portable stand of the kind above referred to, conveniently adjustable to adapt the stand to mounting upon trees of different shapes and sizes, with the trunk and/or branches extended at any of a variety of different angles.

A further object of the invention is to provide a stand of the kind referred to which is capable of ready mounting or erection in remote or isolated areas without the use of special tools and with a minimum of noise, these characteristics being of importance particularly for hunters.

Another object of the invention is to provide a portable stand which is not only readily erected, but which may also be taken down and collapsed thereby providing for convenient transport of the stand from one site to another.

It is also an objective of the invention to provide for the interconnection of all parts of the stand in a unitary assembly when the stand is collapsed, so that all parts are retained in association with each other when the stand is being transported from one site to another.

A further object of the invention is to provide for convenient mounting of camouflage elements such as branches or twigs of the trees on which the stand is mounted, and to provide for support of arrows in positions conveniently accessible to an archer using the stand.

How the foregoing and other objects and advantages are attained, together with others which will occur to those skilled in the art, will be clear from the following description referring to the accompanying drawings illustrating a preferred embodiment of the invention, and in which:

FIG. 1 is a plan view of a portable platform according to the invention, the stand being shown mounted upon a tree trunk, the tree trunk being shown in horizontal section in this figure;

FIG. 2 is an elevational view of the platform and tree trunk shown in FIG. 1;

FIG. 3 is an enlarged fragmentary detailed view of the connection of one of the supporting legs to the platform;

Figure 4:
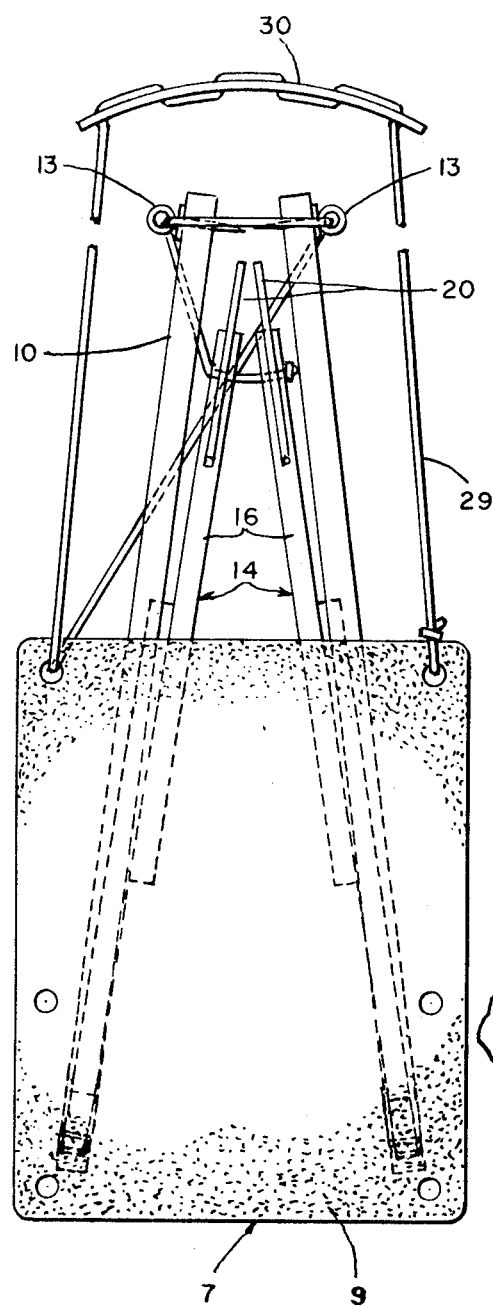
FIG. 4 is a view of the platform in collapsed condition ready for transport.

The portable stand illustrated in the drawings comprises a platform 7. Although the platform may be formed of a variety of materials, exterior grade plywood is appropriate, and it is desirably painted for instance a dull black. The platform is provided with certain apertures for connection of other parts, as will be explained and if desired may also be provided with a number of lightening holes 8. The platform is desirably covered with some rug type of covering indicated at 9. This covering may be adhesively applied and serves to obstruct view through the lightening holes, to prevent noise from movement of the user's feet on the platform, and to provide some degree of comfort or warmth if the user sits.

For the purpose of mounting the stand, a pair of beams 10,10 is provided, each beam being pivotally connected with the platform by a bolt indicated at 11. The beams may be formed in any of a number of ways for instance by interconnecting two pieces of wood, for instance plywood. It will be observed that the bolts 11 serve to connect the ends of the beams to the platform toward one edge thereof and that the beams extend from the point of connection under the platform with the other or free ends of the beams projecting beyond the opposite edge of the platform in order to embrace a tree on which the stand is to be mounted, for instance the trunk 12 of a tree as indicated in FIGS. 1 and 2. Each beam is adapted to be secured to the tree by means of a manually insertable screw such as indicated at 13. This may be a large screw or log bolt having an eye or other enlargement at the head end for convenient manual insertion. The beams 10 are provided with a series of spaced holes in any one of which the fastening screw 13 may be inserted and, in this way, the beams may readily be fastened to tree trunks of different diameters.

The support for the platform further includes a pair of legs indicated generally at 14,14. Moreover, each leg is desirably made of upper and lower leg pieces 15 and 16 formed of any desired material for instance, either wood or metal, and each having a series of apertures 17 which may be brought into registry with each other in different axial positions so that the effective length of each leg may be adjusted. In any adjust position, the legs are secured to each other by means of bolts 18 having wing nuts 19 associated therewith. At its lower end each leg is provided with a spike or pointed element 20 adapted to be partially inserted into the trunk or other part of the tree on which the legs are to be supported.

At its upper end each leg 14 is connected by means of a horizontal bolt 21 to a bracket 22, so that the leg may freely swing about the horizontal axis of the bolt 21 as a pivot. The bracket 22 in turn is connected with one of the beams 10 by means of the bolt 11 serving to attach that beam to the platform 7. The bolt 11 serves also to provide an upright pivot axis for the associated leg 14 as well as for the associated beam 10. In this way each leg is provided with freedom for swinging motion not only in a vertical plane (about the axis of bolt 21), but also in a horizontal plane (about the axis of the upper right bolt 11). Thus, the legs are adjustable in length and also universally adjustable with respect to their angular position, and in this way provision is made for mounting of the stand upon the trunk and/or limbs of trees of a variety of shapes and sizes.

The beams 10 may, if desired, be retained in the adjusted angular positions by means of bolts 23 provided with wing nuts 24 these bolts being extended through the beams and also through slotted apertures in the platform as indicated at 25.

Sockets or slots such as shown at 26 in FIG. 1 may be provided in each beam, these sockets serving to receive arrowheads of arrows being used by an archer standing upon the platform. For the purpose of providing these sockets the beams 10 may be apertured and the apertures may be lined with plastic or resin insets providing a frictional interengagement with the arrowheads to maintain the arrows in standing or upright position, while at the same time permitting easy withdrawal of the arrowhead from the slot. The positioning of these arrowhead sockets in the beams in the region where the beams project from the platform toward the tree on which the stand is mounted, so locates the sockets, and thus also the arrows mounted thereby, (see portion of arrow indicated at 27 in FIG. 2) so that the arrows are conveniently accessible to an archer standing upon the platform.

A number of holes or apertures 28 may be provided along the side edges of the platform to receive branches, twigs or other camouflage materials.

For security a cord or rope 29 is desirably threaded through apertures in the legs 14 and tied around the tree in order to prevent unintentional dislodgment of the spikes 20 from engagement with the tree.

When the stand of the invention is demounted, it may readily be collapsed to a condition represented in FIG. 4 in which the legs 14 are swung into substantial parallelism with the beams 10 and thus also with the platform 7. Both the beams and the legs are then swung toward each other and the cord 29 which may be employed in the manner described above with reference to FIGS. 1 and 2 may then be threaded through apertures at the corners of the platform and through the apertured heads of the lock bolts 13, the bolts for this purpose, being inserted through apertures at the ends of the beams 10 as is shown in FIG. 4. A portion of the cord 29 may also be threaded through apertures in the legs 14, as is indicated. An intermediate portion of the cord 29 may also be threaded through a series of apertures in the arcuate shoulder strip 30, thereby providing a convenient harness for carrying the stand on the shoulder without the necessity for any other handling, during transport from one site to another.

Figure 5:
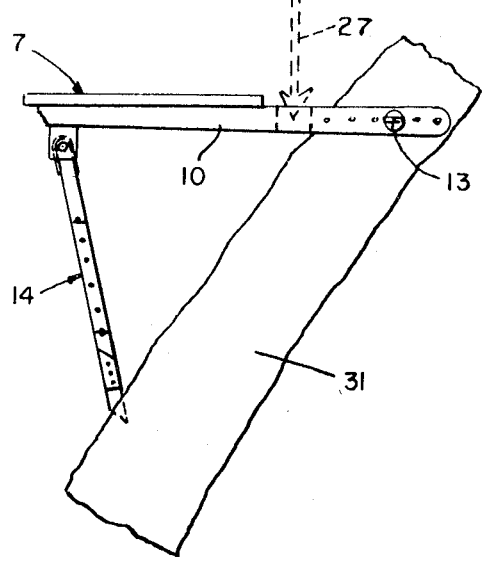
FIG. 5 is a view similar to FIG. 2, but illustrating the mounting of the platform on the trunk of a tree inclined at a substantial angle to the vertical.
Figure 6:
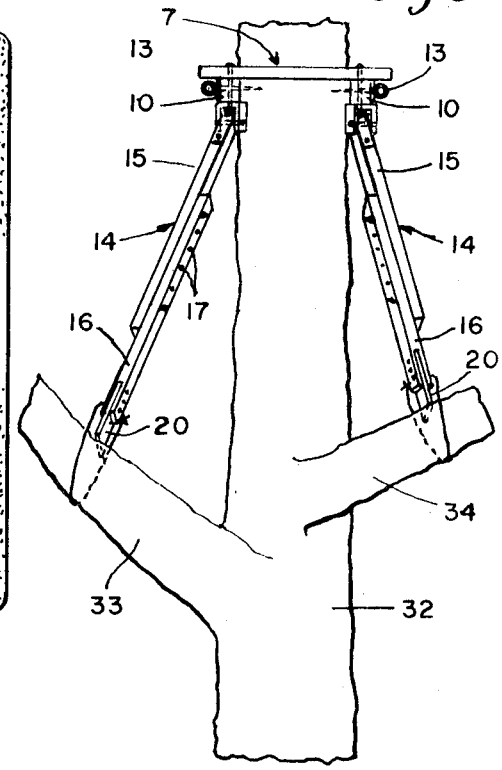
FIG. 6 is a view of the mounting of the platform in still another mounting situation where the legs of the platform engage branches of a tree.

FIGS. 5 and 6 illustrate two alternative mounting arrangements for the stand. In FIG. 5 the tree trunk 31 is shown as being inclined substantially from the vertical, but notwithstanding this inclination, it will be seen that the beams 10 and the legs 14 are readily adaptable to the mounting of the stand with the platform in substantially horizontal position.

In the alternative mounting illustrated in FIG. 6 the tree trunk 32 is shown as having branches 33 and 34 extended at different angles from the trunk, and here also the flexibility of the leg arrangement readily adapt the stand to this mounting situation.

From the foregoing it will be seen that the invention provides a stand having a substantially universal mounting facility. The operations required to erect the stand and also to remove it from a given site may all be accomplished by hand without the necessity for hammering. The stand is sturdy and yet of light weight and quite capable of being installed quickly under a variety of site conditions.

I claim:

1. A portable stand adapted to be removably mounted on trees, comprising a platform, a pair of spaced platform supporting beams with one end of each beam connected with the platform toward one side thereof and extended from the point of connection under the platform, and with the other or free ends of the pair of beams projecting beyond the platform to embrace a tree on which the stand is to be mounted, the connection of the beams with the platform including pivot means providing for variation in the spacing of the free ends of the beams to embrace trees of different sizes, and platform supporting means comprising a pair of legs extended downwardly from the platform the legs being connected with the platform by said pivot means with freedom for swinging movement about upright axes to adapt the legs to trees of various shapes and sizes.

2. A stand as defined in claim 1 and further including adjustable means for fastening the beams to the platform with the beams in different pivotal positions.

3. A portable stand adapted to be removably mounted on trees, comprising a platform, a pair of spaced platform supporting beams with one end of each beam connected with the platform toward one side thereof and extended from the point of connection under the platform, and with the other or free ends of the pair of beams projecting beyond the platform to embrace a tree on which the stand is to be mounted and platform supporting legs extended downwardly therefrom to engage a tree, the legs being adjustable in both length and angular disposition in two planes with respect to the platform to adapt the legs to trees of various shapes and sizes and the beams and legs being connected with the platform by common pivot joints.

* * * * *